Figure 1:
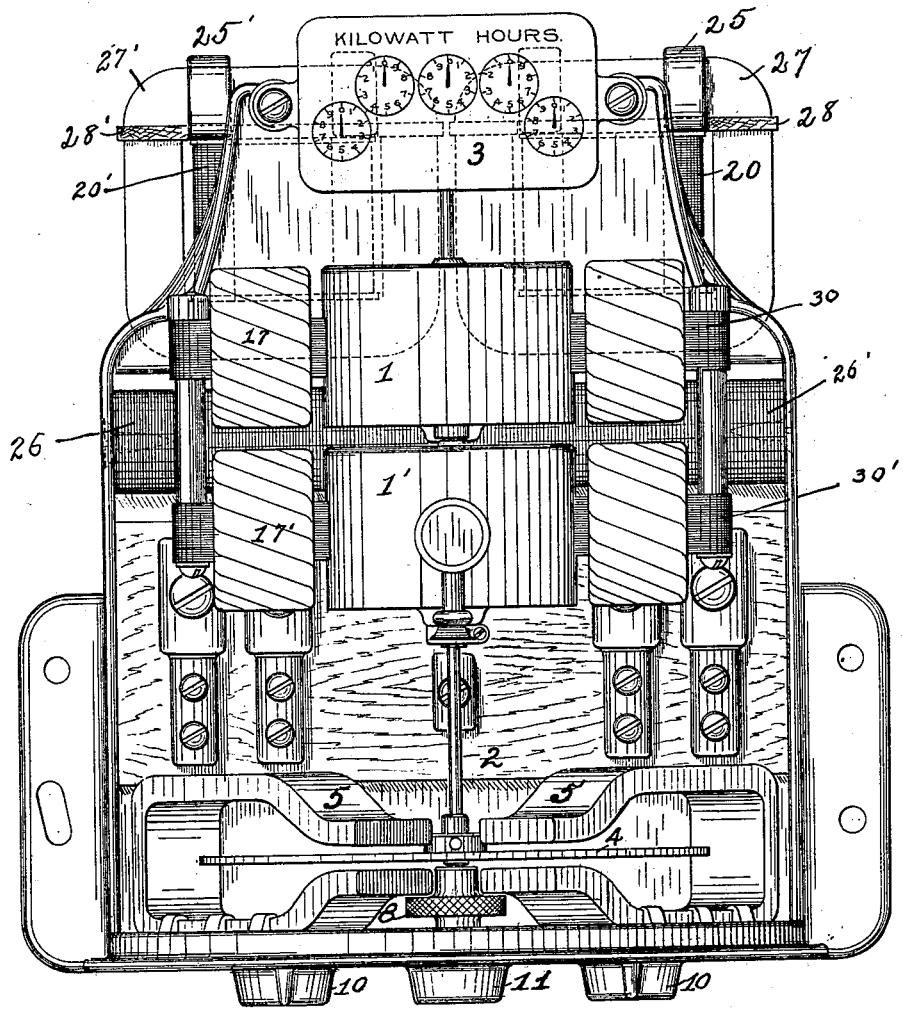

No. 698,654. Patented Apr. 29, 1902.
T. DUNCAN.
ALTERNATING CURRENT METER.
(Application filed Aug. 28, 1899.)

(No Model.) 4 Sheets—Sheet 1.

Witnesses
Max Zabel
C. E. Nuerrt

Inventor
Thomas Duncan
By his Attorneys
Charles A. Brown & Craff

No. 698,654. Patented Apr. 29, 1902.
T. DUNCAN.
ALTERNATING CURRENT METER.
(Application filed Aug. 28, 1899.)
(No Model.) 4 Sheets—Sheet 3.

No. 698,654. Patented Apr. 29, 1902.
T. DUNCAN.
ALTERNATING CURRENT METER.
(Application filed Aug. 28, 1899.)
(No Model.) 4 Sheets—Sheet 4.

Witnesses
Samuel R Bachtel
Max W. Jabel.

Inventor
Thomas Duncan
By his Attorneys
Charles A. Brown & Cragg

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,654, dated April 29, 1902.

Application filed August 28, 1899. Serial No. 728,692. (No model.)

*To all whom it may concern:*

Be it known that I, THOMAS DUNCAN, a citizen of the United States, residing at Chicago, in the county of Cook and State of Illinois, have invented a certain new and useful Improvement in Alternating-Current Meters, (Case No. 270,) of which the following is a full, clear, concise, and exact description, reference being had to the accompanying drawings, forming a part of this specification.

My invention relates to meters for measuring alternating currents, and has for its object the provision of an induction-meter which is capable of measuring the energy in a number of alternating-current circuits.

Heretofore a number of integrating wattmeters have been employed for integrating the energy consumed in polyphase systems of electrical distribution, one meter being associated with each circuit. In order to ascertain the energy in the system, it was necessary to take into consideration the several readings of the independent meters.

It is the object of my invention to provide an improved induction-wattmeter which may be associated with a number of alternating-current circuits and which is adapted to furnish a single reading to integrate the total energy in the circuits.

The preferred embodiment of my invention which I show herein is adapted particularly for use in connection with diphase systems of alternating-current distribution; but I do not wish to be limited to the number of circuits to which the meter of my invention may be adapted.

Heretofore in the measurement of power in diphase circuits it was necessary to have a wattmeter included in each circuit thereof in order to obtain the correct indications of the power, these wattmeters furnishing separate measurements. Power in three-phase circuits, however, may be also measured with two integrating wattmeters by employing the well-known two-wattmeter method. Two indicating-meters also may be employed in measuring three-phase circuits when the power factor is fifty per cent. or greater. Heretofore wattmeters have been devised each having one recording-train and a single armature in the form of a disk in inductive relation to coils included in the different circuits; but these meters are not reliable, since if one circuit has an inductive loading greater than another the readings will not be proportional to the energy consumed.

In accordance with my invention I employ mechanically-coupled armatures, one for each circuit, for operating the indicator or registering-train, each armature being in inductive relation to field-coils, one set of field-coils being associated with each circuit, the armatures thereby being inductively acted upon independently by current traversing the respective field-coils. By this construction I am enabled to gain many important advantages. A single reading is sufficient to determine the energy in the working conductors of a polyphase system of alternating-current distribution, since one recording-train or indicator is entirely dispensed with. A single retarding device may be employed. I am also enabled to employ a single initial torque device associated with the two motor members of the meter. The entire apparatus may be easily contained in a single casing, and a single-phase circuit may be employed for testing and calibrating the meter, whereby the use of a special polyphase generator for testing and calibrating purposes is not required.

I will explain my invention more particularly by reference to the accompanying drawings, illustrating the preferred embodiment thereof, in which—

Figure 2:
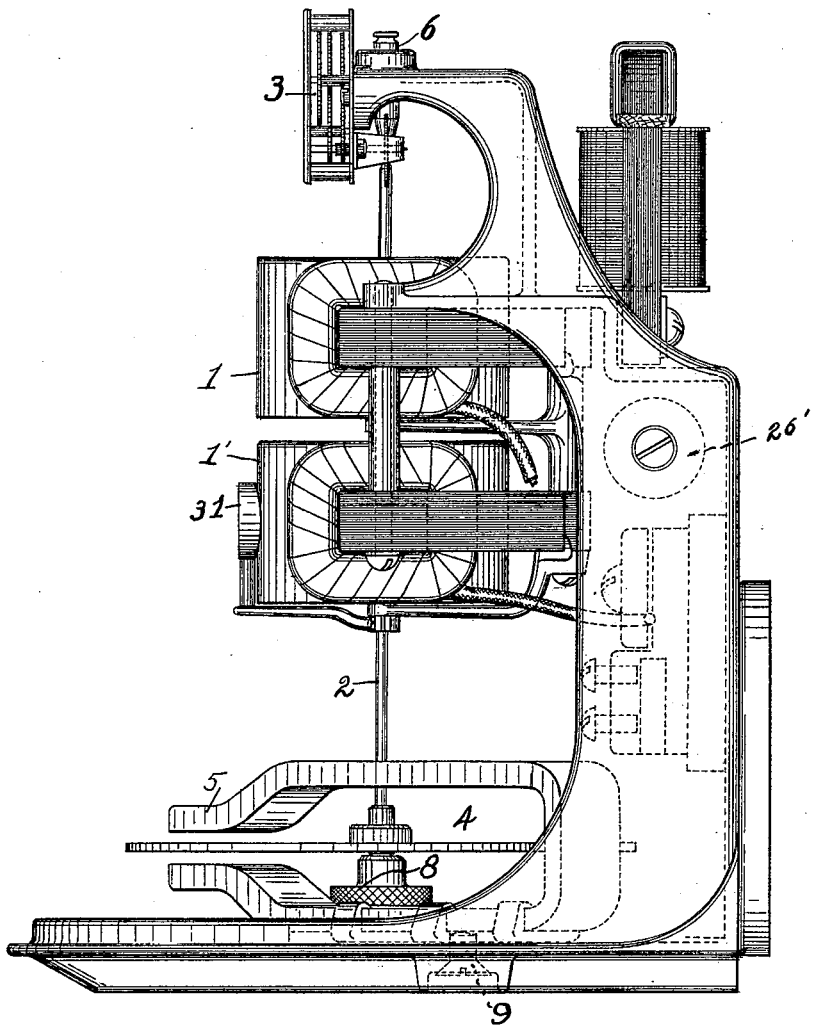
Figure 3:
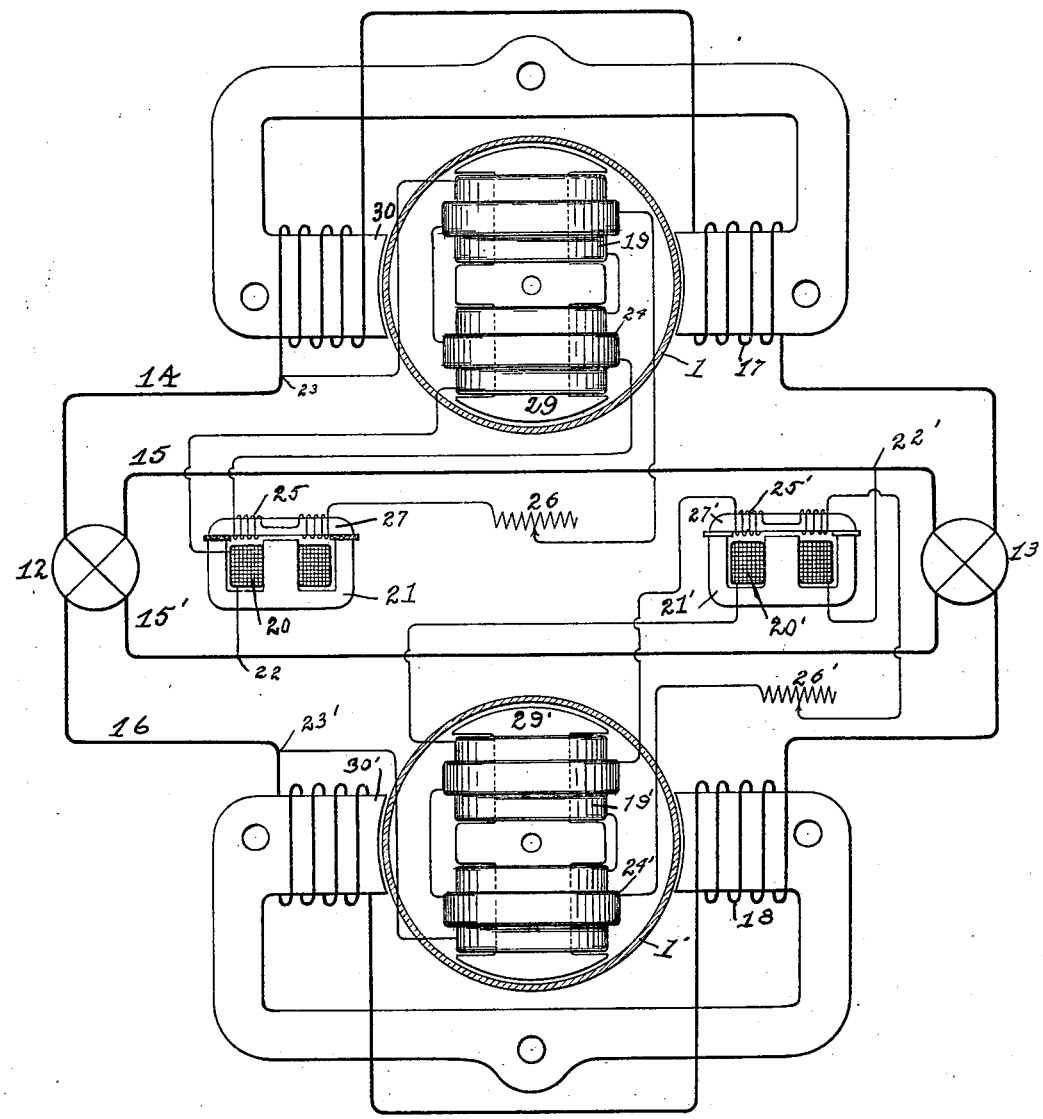
Figure 4:
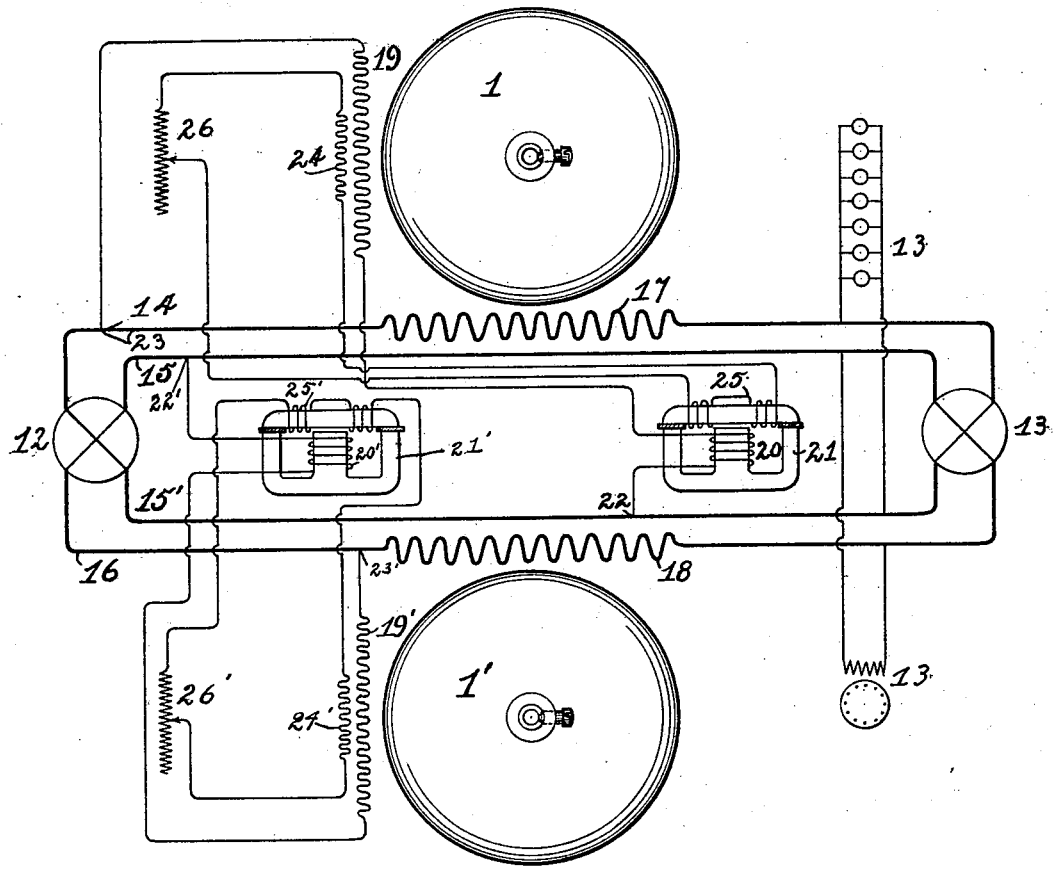
Figure 5:
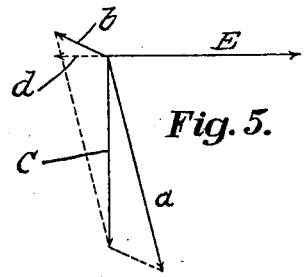
Figure 6:
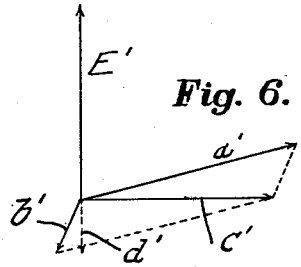

Figure 1 is a front elevation of my improved meter, its association with a polyphase system of distribution being diagrammatically indicated. Fig. 2 is a side elevation of the meter shown in Fig. 1. Fig. 3 is a sectional plan view of the motor elements of the meter, which are shown displaced for the sake of clearness, the connections of the motors of the meter with a diaphase system of distribution being indicated diagrammatically. Fig. 4 is a simplified diagrammatic view showing the circuit connections of the meter. Figs. 5 and 6 are vector diagrams for illustrating the electrical problems involved.

Like parts are indicated by similar characters of reference throughout the different views.

I will first generally describe the mechanical construction of the meter by reference more particularly to Figs. 1 and 2.

Two armatures 1 1', preferably in the form of cylindrical cups, each open at the bottom, are mounted upon a spindle 2, which operates the measuring-train 3. A single disk 4 is secured to the lower end of the spindle to act as one member of a retarding device, this disk being disposed between the poles of permanent magnets 5 5, acting as the other member of the retarding device. An upper bearing 6 and a lower jeweled bearing are provided for supporting the spindle 2 vertically. I provide a thumb-nut 8 for raising the lower end of the spindle from its bearing. In order to secure the magnets 5 5 in place, I preferably provide screws 9, passing through pockets 10 10, the pockets being filled, preferably, with sealing-wax after the magnets have been properly adjusted. A pocket 11 is provided for supporting the lower bearing of the spindle, this pocket being also preferably sealed from beneath by sealing-wax.

The meter shown in Fig. 1 is connected with a three-wire diaphase system, a generator 12 being shown in circuit with a translating device, in this instance a motor 13. Conductors 14, 15, and 16 convey the current. In Figs. 3 and 4 four-wire diphase systems are indicated, conductors 14 15' conveying current of one phase from the generator 12, while the conductors 15 16 convey the remaining current.

In describing the operation of the meter reference may be had to Figs. 3 and 4, and particularly to Fig. 4. In Fig. 4 the generator 12 is arranged to supply current to a number of translating devices 13, which in this instance are of different character. The armatures 1 1' in Figs. 3 and 4 are shown as separated, but it is to be understood that they are mechanically connected, preferably by being mounted upon the same spindle. The currents in the system shown are in quadrature—that is, there are two single-phase currents, so to speak, which are ninety degrees apart in phase. The current of the first phase, for example, will pass through the series field-winding 17, inductively related to the armature 1, while the current of the second phase will pass through the series field-winding 18, inductively related to the armature 1'. The strength of the magnetic fields, due to the series field-windings upon their respective armatures, will correspond with the current strength at any instant. To produce magnetic fields for the armatures corresponding to the voltage, suitable windings, located in bridge of each circuit, may be employed. I have shown shunt field-windings 19 19' inductively associated with the armatures 1 1', respectively. As the motors of the meter are induction-motors, a difference of phase should exist between the magnetic fields of the coils 17 19 and 18 19', respectively, and as the torque must be proportional to the real energy or true watts there should be a difference in phase of ninety degrees between the magnetic effects due to the shunt-field with respect to the impressed or line pressure. By maintaining this phase relation between the magnetic effects due to the shunt-fields and the impressed pressures the torque will always be proportional to the true energy, or, to state the matter mathematically, the reading would be proportional to current times the electromotive force times the cosine of the angle of lag. In practice supplemental means should be employed for modifying the phase of the magnetic effects due to the shunt-fields. To have the magnetic effects due to the shunt-field differ in phase exactly ninety degrees from the pressure, I preferably employ the apparatus shown in Figs. 3 and 4. Referring first to the circuit including the conductors 14 and 15', I have shown an impedance-coil 20 in series with the shunt field-winding 19, a core 21 having three legs being preferably employed for the impedance-coil, one terminal of the latter coil being connected with the lead 15' at the point 22, the other terminal being connected directly with one terminal of the shunt field-winding 19. The other terminal of the shunt field-winding is connected at the point 23 with the remaining lead 14 to complete the bridge connection between the leads. The impedance-coil causes the current in the shunt field-winding to lag somewhat less than ninety degrees with relation to the pressure. I provide a second winding 24, which is included in series with windings 25, inductively related to the impedance-coil 20, the said impedance-coil and windings 25 constituting, respectively, the primary and secondary members of a transformer. A non-inductive resistance 26 is employed for controlling the amount of current that flows through the coil 24.

I will now explain by reference to the vector diagram shown in Fig. 5 the manner in which the resultant of the magnetic effects due to the current in the coils 19 and 24 is caused to have a difference in phase of ninety degrees from the pressure. The pressure or electromotive force between the conductors 14 15' is represented by a horizontal line E. The oblique line $a$ indicates the current through the coils 19 and 20, the diagram showing that this current, passing through the shunt-field of the meter, is not quite in quadrature with the electromotive force. The dotted line $d$ represents the electromotive force induced in the coil 25. The oblique line $b$ represents the current flowing in the coils 24 and 25. Since the current and magnetism are in phase with each other, the resultant magnetic effect of the component magnetic effects due to the currents in the windings 19 and 24 may by this means be put in exact quadrature with relation to the pressure, the magnetic field due to the coil 19 being indicated by the line $a$ and the magnetic field due to the coil 24 being indicated by the line $b$. The resultant of these two magnetic fields is indicated by the line $c$ and is the geometrical sum of the component fields, the resultant field $c$ being at right angles to the impressed or line pressure E.

The instrumentalities herein shown for adjusting the proper phase relation between the magnetic effects due to the shunt-coil and the impressed pressure are disclosed in my Patent No. 623,530, issued April 25, 1899.

The apparatus associated with armature 1' is similar to the apparatus associated with armature 1, and similar characters of reference, each with an added exponent, (',) are employed to indicate similar instrumentalities. The vector diagram shown in Fig. 6 is given to illustrate the operation of the apparatus employed for bringing about the desired phase relation between the magnetic effects due to the shunt-coil and the line-pressure in connection with the motor of which the armature 1' is a part, and the explanation given above in connection with the vector diagram shown in Fig. 5 may be repeated in connection with the diagram shown in Fig. 6 and the apparatus associated with the armature 1', the letters of reference being similar, except that each has an added exponent, ('.) Figs. 5 and 6 show a ninety-degree difference in phase relation between the pressures in the two circuits.

Figs. 1, 2, and 3 show the preferred manner of disposing the coils of the motor members of the meter. Referring first to Figs. 1 and 2, the transformers formed of the inpedance-coils 20 20' and coils 25 25' are mounted at the rear of the meter, cores 27 27' being employed for the transformers to complete the magnetic circuit through the cores of the coils 20 20', magnetic distance-pieces 28 28' being employed for the purpose of varying the self-inductive effects of the impedance-coils 20 20'. The motor members of the meter are provided with central cores 29 29', about which the windings 19 19' are placed, these windings being preferably each subdivided into two coils placed upon opposite sides of the spindle 2. The windings 24 24' are also preferably subdivided into two coils, each surrounding a coil of the main shunt-winding. The poles 30 30' of the series fields are preferably disposed in such a manner that the series windings, which are each preferably subdivided into two coils, have their axes at right angles to the shunt-windings. The non-inductive resistances 26 26' are preferably located at the rear of the center, as shown most clearly in Figs. 1 and 2.

A single initial torque device 31 may be employed in association with but one armature.

Having thus described my invention, I claim as new and desire to secure by Letters Patent—

In a wattmeter for polyphase circuits, the combination with a plurality of revoluble armatures mounted upon a common shaft, of series coils, one in inductive relation with each of said armatures, each series coil being adapted for inclusion with an independent electric circuit, a shunt-coil across the main circuit, in inductive relation with each armature, a second shunt-coil also in inductive relation with each of said armatures and each of the aforesaid shunt-coils, the second shunt-coils receiving current from the aforesaid shunt-coils associated therewith by induction, means for regulating the degree of induction, a variable resistance inserted with each of said second shunt-coils, whereby the magnetic effects due to the shunt-field are caused to differ in phase ninety degrees from the impressed pressure of the respective circuits, a single counting-train operated by the said shaft, a retarding-disk mounted upon said shaft, and a single initial starting-coil 31 associated with one of the said armatures to compensate for friction and other losses, said single initial starting-coil operating in a dual capacity to compensate for the said losses of each of said armatures.

In witness whereof I hereunto subscribe my name this 21st day of August, A. D. 1899.

THOMAS DUNCAN.

Witnesses:
 CHARLES A. BROWN,
 C. E. HUBERT.